July 30, 1968  J. J. STRANAHAN  3,394,722
AUTOMATIC CONTROL SYSTEM
Filed June 30, 1966  3 Sheets-Sheet 1

July 30, 1968  J. J. STRANAHAN  3,394,722
AUTOMATIC CONTROL SYSTEM

Filed June 30, 1966  3 Sheets-Sheet 3

United States Patent Office 3,394,722
Patented July 30, 1968

3,394,722
AUTOMATIC CONTROL SYSTEM
John J. Stranahan, Port Arthur, Tex., assignor to Texaco
Inc., New York, N.Y., a corporation of Delaware
Filed June 30, 1966, Ser. No. 561,797
10 Claims. (Cl. 137—84)

This invention relates to an automatic control system for maintaining a measured variable at or near a predetermined value. More particularly, this invention relates to a pneumatic control system, although not limited thereto, wherein the measured variable is regulated with improved accuracy utilizing simple equipment and accordingly at less expense.

Control of a variable such as might be utilized in a process is obtained by measuring the change in the process variable which can be for example, temperature, pressure, flow rate, etc. and utilizing a signal proportional thereto to operate a controller which is in essence a computer. The controller provides an output control signal which positions a final control element which in turn affects the process variable by an amount in the correct direction to wipe out the measured variable change. The mechanization, that is the means of measuring the change in the controlled variable and the controller itself, can take many different forms dependent usually on the form of the controlled variable, that is whether it is a pressure, a temperature, etc. and on the type controller selected, that is, whether it is electrical, pneumatic, etc.

The simplest mode of automatic control is two position, or on-off. In this mode the computer function of the controller changes the value of the controller output, or the manipulated variable, from one extreme to the other as the measured value of the controlled variable goes above and below the set point or desired value. As the controlled variable drops below the set point, the controller output is turned on to its maximum value and it is turned completely off as the controlled variable rises above the set-point. The main disadvantage of this mode of control is the large amplitude oscillations of the controlled variable about the set-point. Of course, as the system becomes a more rapidly responding one, the amplitude of the oscillations will decrease but the frequency of controller action will increase.

Another control mode, proportional control, has been devised which overcomes the main disadvantage, that is the large amplitude cyclical nature of the on-off control mode. In this mode of control the signal proportional to the controlled variable is compared with the set-point value and an error signal is derived which affects the controlled variable to reduce the error signal. The main advantage of this type of control over the on-off controller previously discussed is its relatively non-cyclical nature, that is, its smoothness of control.

It should be appreciated that the operation of the control system would be improved if the sensitivity of detecting changes in the measured variable could be enhanced. This could be done by amplifying or multiplying the detected change in the measured variable so that a greater error signal could be provided for a small change in variable and thus improve the sensitivity of the system. However, in proportional control systems, any appreciable amount of multiplication or amplification of the detected change in the measured variable has resulted in instability of the system. In a stable system, the effects of disturbances, or the transients in the system, die out with time, whereas in an unstable system the disturbances increase until limits are reached or failure results. There are, of course, degrees of stability; that is, a system may be rapidly or slowly returned to its set point.

Accordingly, it i san object of the invention to provide a control system which utilizes the simplest known mode of control and yet obtains the advantages of a more sophisticated control system.

It is a further object of the present invention to provide a control system in which improved response is obtained through amplification or multiplication of the change in measured variable without introducing instability.

It is a further object of the present invention to provide a pneumatic control system utilizing a new combination of known components to provide an improved control of a process variable.

It is another object of the present invention to provide a pneumatic control system which can be switched from manual to automatic control without introducing any switching transients.

The invention relates to a control system for adjusting a control element to regulate a controlled variable which comprises in combination a measuring means for providing a signal proportional to a change in the controlled variable. A biasing means is provided which introduces a negative bias, that is, subtracts a preset amount from the proportional signal produced by the measuring means. The output from the biasing means is multipled by a multiplying means, the multiplied output signal of which is introduced as one input to a comparator. Also connected to the comparator is a means for introducing a predetermined set-point signal. The comparator compares the multiplied signal with the set-point signal and produces a maximum output signal when the multiplied signal is less than the set-point signal and no signal when the multiplied signal is greater than the set-point signal. The comparator is followed by a signal passage restriction means which provides a control signal build-up with time to the value of said maximum output signal when said maximum output signal is obtained from said comparator and which provides a decay with time of a control signal existing at the output of the signal passage restriction means when no signal output is provided by said comparator, thereby providing a more sensitive relatively smooth variation of the control element in an on-off control mode of operation.

The above-mentioned and other features and objectives of this invention and the manner of attaining them will become more apparent and the invention itself will be best understood by reference to the following description of an embodiment of the invention taken in conjunction with the accompanying drawings wherein.

The control system as shown and described is a pneumatic control system, however, it will be appreciated that the invention is not limited to a pneumatic control system but is applicable to any control system such as electrical, hydraulic, etc.

Figure 1:
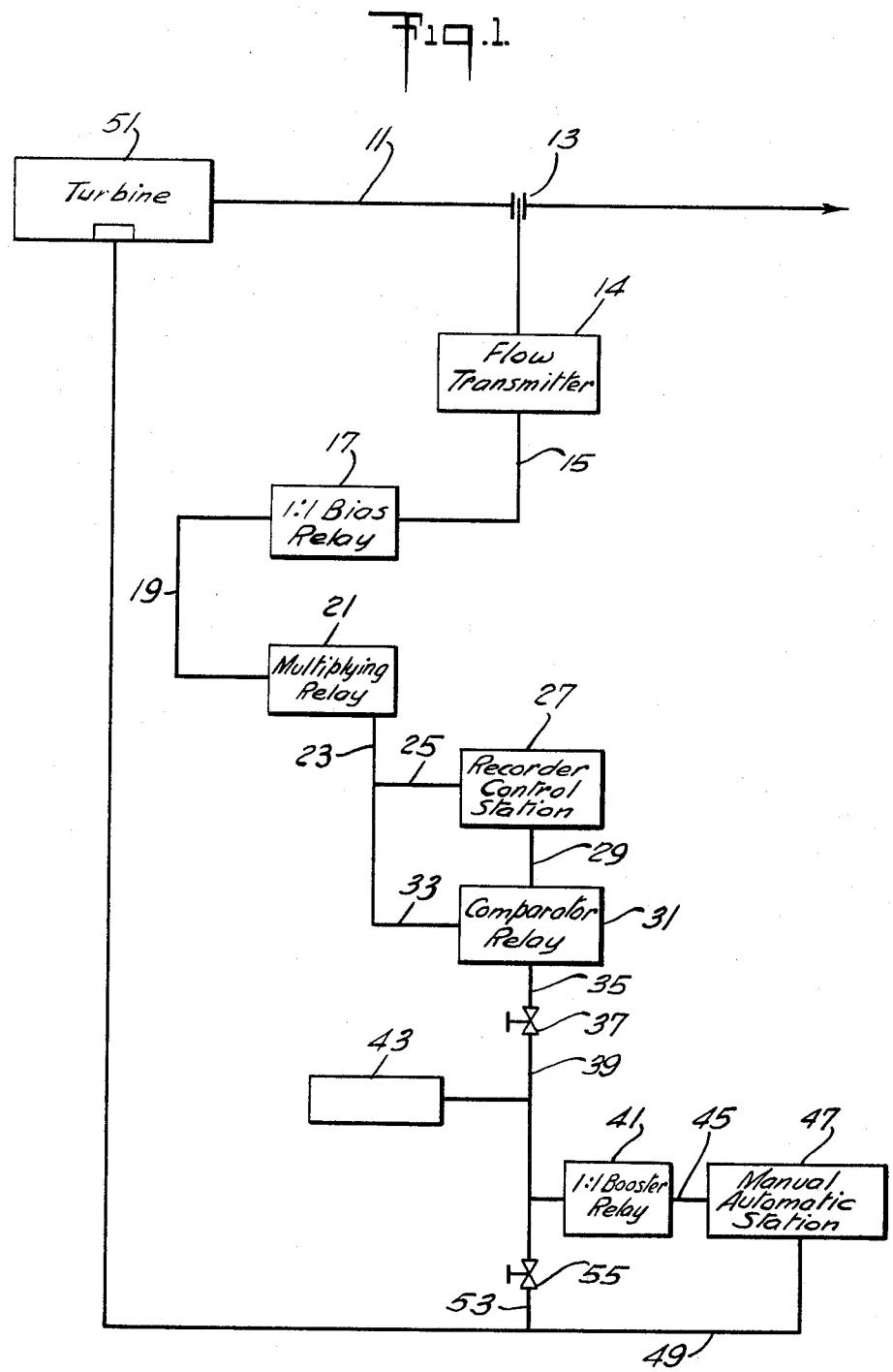
FIG. 1 is a block diagram of a control system utilizing the combination of components of the present invention.

Referring now to the drawings in detail and to FIG. 1 in particular, there is shown a conduit 11 which is carrying the variable to be controlled. In the particular system shown, the flow rate is being controlled, however, the variable could be some other function such as pressure, temperature, velocity, etc. The flow rate in conduit 11 is detected by a measuring instrument 13. An air pressure, which varies in response to the changes in the measured variable, is also provided. This air pressure is supplied by means of a transmitting instrument 14, which responds to changes in the measured process variable. Such measuring and transmitting instruments are well known. An example of an instrument which could be utilized in the present control system is produced by the Foxboro Co. and is known as their 13a flow transmitter. The pneumatic pressure proportional to the change in the measured variable is conducted via conduit 15 to a 1:1 bias relay which for use in the system is negatively biased. This negative bias provides in essence a fixed subtraction of a predetermined pressure from the pressure signal received from flow transmitter 14. The flow transmitter 14 referred to above provides an output pressure signal the full range of variation of which is from 3 p.s.i. to 15 p.s.i. This range of variation covering the full range of change of the measured variable. Accordingly, the 1:1 bias relay is preset to remove a predetermined amount of pressure from the signal in order to provide a signal output which is within a preferred range for subsequent operations thereon. The output of the 1:1 bias relay 17 is provided via a conduit 19 to a multiplying relay 21. The multiplying relay 21 as its name implies multiplies the detected pressure variations. In the prior art pneumatic control systems, multiplying relays have been utilized, however, a multiplication factor of about 2 has been the practical maximum since anything higher tends to introduce instability to the system. In the particular embodiment of the invention described herein, a multiplication factor of 8 is utilized without introducing any of the instability of the prior art. It can now be more clearly seen why the 1:1 bias relay is utilized with negative bias. The negative bias brings the pressure signal to a lower pressure value such that the multiplication, when it takes place, results in a process which falls within the desired range of 3 p.s.i. to 15 p.s.i. The multiplied pressure signal from multiplying relay 21 is connected via conduit 23 and conduit 25 to a recorder control station at which the signal is incidentally recorded. The importance of the control station is the introduction of the set-point, that is the signal value which corresponds to the setting of the control element which will produce the desired value of the measured or controlled variable. There are a number of recorder control stations which could be utilized in this invention. An example of a familiar recorder controller is the Bristol 001BJ650 which is a product of the Bristol Company, Waterbury Conn. The signal proportional to the set-point provided at the recorder control station 27 is conveyed via conduit 29 to a comparator relay 31. A further input to comparator relay 31 is provided via conduit 33 and consists of the multiplied pressure signal from multiplying relay 21. The comparator relay 31 compares the multiplied signal with the signal proportional to the set-point and provides an output at full pressure when the multiplied signal is less than the set-point and provides no output when the multiplied signal is greater than the set-point signal. Thus the comparator relay 31 is an on-off device which as previously mentioned is the simplest and cheapest type of control. The output of comparator relay 31 is connected via conduit 35 to an adjustable restriction within the conduit. The adjustable restriction 37 provides a restriction to the pressure transmitting flow of fluid from the comparator relay 31 when the signal output therefrom is a full-pressure output. Without going into the theory of flow through a restriction or orifice it can be seen that the restriction acts as a resistance R such that the pressure applied thereto bleeds therethrough such that a delay is introduced and the pressure beyond the restriction builds up in accordance with an RC time constant where the R (resistance) is dependent on the size of the restriction and the C is the capacity or volume of the system beyond the adjustable restriction into which the pressure flow passed by the restriction can expand.

When the comparator relay provides its no-output signal, the adjustable restriction 37 allows the pressure built up beyond the restriction to bleed to atmosphere thus diminishing the signal fed to the control element in accordance with the RC (resistance) (capacitance) time constants of the restriction as mentioned above. Connected to conduit 39 which extends from the adjustable restriction 37 to a 1:1 booster relay 41, is a small reservoir 43 by means of which the correct volume of capacitance for the desired RC time constant of the adjustable restriction 37 can be obtained. The 1:1 booster relay 41 is included to prevent a pressure drop in the large volume of conduit which may exist before the pressure signal is applied to the control element and to prevent an error due to an inadvertent leak in the system. The booster relay applies sufficient volume of fluid. It should be appreciated that the 1:1 booster relay provides an output which corresponds to the input thereof. Therefore, it provides a pressure signal output which varies with an RC time constant in accordance with the signal produced by the adjustable restriction 37. The output of the relay 41 is conveyed via conduit 45 to manual-automatic station 47. The manual-automatic station is a switching station in the form of a three way valve for switching between manual and automatic operation of the control element. The manual-automatic station is a well known component in pneumatic control systems. One example is Bristol manual loader 00BK 652 a product of the Bristol Company, Waterbury, Conn. In the automatic mode of operation the pressure signal provided by 1:1 booster relay 41 passes through the manual-automatic station 47 and is applied via conduit 49 to the control element which in this case is the governor on the air turbine 51. When the manual-automatic station 47 is set to the manual mode of operation, the operator manually makes an adjustment in accordance with the value of the controlled variable which produces the pressure signal which is fed to the control element to regulate the controlled variable. It will be appreciated that a smooth transition from the manual to automatic mode may not be obtained since the pressure signal in the automatic mode may be very different from that inserted by the operator in the manual mode. Therefore, to prevent a transient or bump input to the control element when switching from manual to automatic mode a feedback means is provided consisting of a conduit 53 which is connected from conduit 49 to conduit 39 leading to the 1:1 booster relay 41. A feedback needle valve 55 is located in the conduit 53 which allows a control pressure equal to the control pressure in conduit 49 to be applied to 1:1 booster relay 41. Thus, if the pressure applied to relay 41 is less than the control pressure resulting from the manual adjustment, needle valve 55 will allow the build up of the pressure in the feedback system to the control pressure valve. On the other hand, if the pressure signal applied to relay 41 is higher than the control pressure resulting from the manual adjustment, needle valve 55 acts as an equalizer thus reducing the higher pressure to the lower value. Thus, switching to the automatic mode of operation, there is a smooth transition since the pressure in both the automatic system and manual system are initially the same. A control system has been described which utilizes the relatively simple and inexpensive on-off control mode of operation and yet obtains relatively smooth control of the variable. The described control system has been found to be between 10 and 20 times as sensitive as the prior art proportional control systems and to be free from the instability usually introduced by any appreciable multiplication of the measured changes in the variable.

Figure 2:
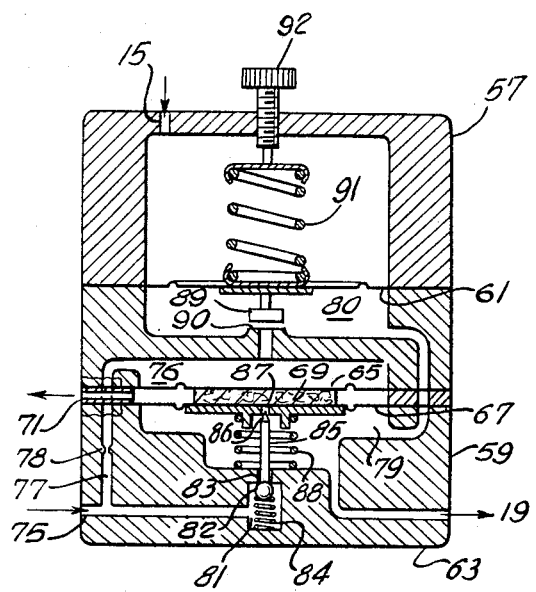
FIG. 2 is a schematic representation of a 1:1 biased relay which can be employed in the control system of FIG. 1.

A suitable 1:1 bias relay for use as element 17 in FIG. 1 is shown schematically in FIG. 2. The bias relay comprises first and second housings 57 and 59 which are separated by a flexible diaphragm 61. Conduit 15 communicates with the interior of housing 57 so that the pressure in this conduit exerts a downward force on diaphragm 61. A bottom housing 63 is mounted adjacent housing 59 and a pair of flexible diaphragms 65 and 67 are positioned therebetween. Diaphragms 65 and 67 are separated by porous material 69, and the region therebetween is vented to atmosphere through a port 71. Supply air pressure is furnished to a chamber 81 in housing 59 through a passage 75 and to a chamber 76 above diaphragm 65 through a passage 77 which has a restriction 78 therein. Outlet conduit 19 communicates with a chamber 79 beneath diaphragm 67 and with a chamber 80 beneath diaphragm 61.

Chambers 81 and 79 are connected by a valve which comprises a ball 82 that engages a valve seat 83. A spring 84 normally urges ball 82 into engagement with valve seat 83. A rod 85 engages ball 82 and extends upwardly to form a valve head 86 which is adapted to restrict an orifice 87 which extends between chamber 79 and the region between diaphragms 65 and 67. A compression spring 88 normally urges the diaphragms upwardly to permit pressure from chamber 79 to be bled to atmosphere through orifice 87 and port 71. Chambers 76 and 80 are separated by a valve which comprises a valve head 89 that is adapted to engage a valve seat 90. Valve head 89 is attached to diaphragm 61 so as to engage valve seat 90 when the diaphragm is depressed. A spring 91 is attached to diaphragm 61 at its lower end and to an adjusting rod 92 at its upper end. Rotation of rod 92 thus regulates the force exerted by spring 91 on diaphragm 61. Spring 91 is attached to adjusting rod 92 and to diaphragm 61 in a manner such that either a compression force or a tension force can be exerted on the diaphragm.

It should be evident that the force exerted on the top of diaphragm 61 is the sum of the forces exerted by spring 91 and the pressure in conduit 15. Spring 91 exerts a tension force in the 1:1 biased relay of the instant invention so that the total force exerted on the diaphragm 61 is less than the force exerted by the pressure in conduit 15 by a predetermined amount which establishes the bias of the relay.

The pressure supplied by conduit 75 is transmitted through restriction 78 to chamber 76 and through the ball valve to chamber 79. The pressure in chamber 79 is less than the supplied pressure due to the leakage through passage 87. Spring 88 exerts an upward force on diaphragm 67 to balance this pressure differential. Chambers 76 and 80 are in communication through the uppermost valve. The forces exerted on the top of diaphragm 61 establish the setting of this uppermost valve and the rate at which pressure is transmitted through the valve. It should be evident that the various forces establish a condition of balance, such that the outlet pressure in conduit 19 is maintained at a predetermined value which is either greater or less than the pressure in conduit 15, depending upon the force exerted by spring 91. This 1:1 bias relay is a commercially available item and does not form a part of the invention per se. It should be evident that other types of bias pressure relays known in the art can be employed for this purpose.

Figure 3:
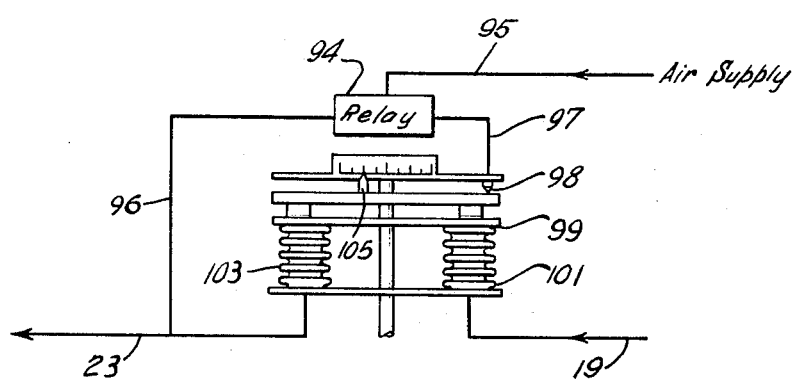
FIG. 3 is a schematic representation of a multiplying relay which can be employed in the control system of FIG. 1.

FIG. 3 is a schematic representation of a multiplying relay which may be utilized as multiplying relay 21 in FIG. 1.

The multiplying relay of FIG. 3 operates on the force-balance principle. The relay 94 passes air supplied by an air supply from conduit 95 to output conduit 96 in accordance with the pressure applied to the relay via conduit 97. This pressure is obtained by the operation of nozzle 98 in conjunction with floating disc 99. Recalling the force-balance principle, the pressure in conduit 97 is determined by the particular spacing of nozzle 98 with respect to the floating disc 99. The closer the floating disc 99 is to nozzle 98 the greater the pressure buildup in conduit 97 and accordingly the greater the output pressure obtained from relay 94.

The positioning of the floating disc 99 with respect to the nozzle 98 is determined by the input pressure applied via conduit 19 which pressure affects the bellows 101 to position the floating disc 99 accordingly. The relay output in conduit 96 is not only fed via conduit 23 to the rest of the system, but is fed back to bellows 103 which pressure acts to reposition the floating disc 99 to balance the forces thereabout. The ratio adjusting lever 105 may be adjusted to affect the positioning of the floating disc and nozzle 98 in response to pressure signal introduced to bellows 101. Thus, it can be appreciated that the changes in output pressure from the multiplying relay are proportional to changes in pressure in the input bellows 101, by an amount dependent upon the setting of the ratio adjusting lever. A number of manufacturers produce a multiplying relay based upon the above set forth principle such as the Multiplying Relay Model 57Z manufactured by the Foxboro Co., Foxboro, Mass.

Figure 4:
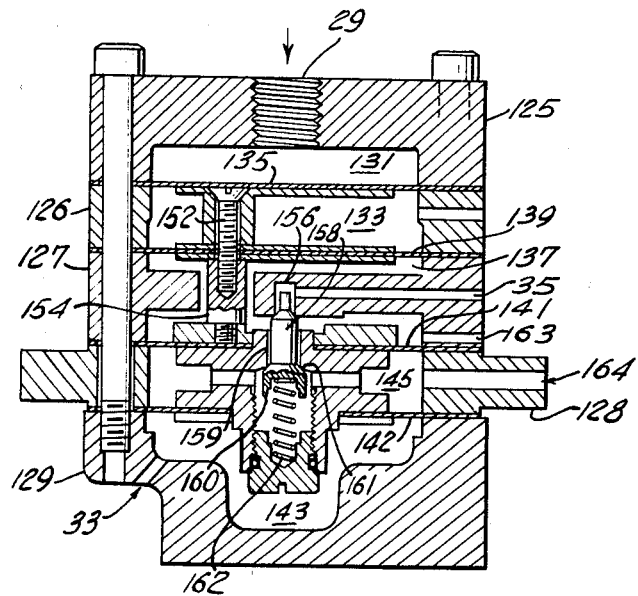
FIG. 4 is a schematic representation of a comparator relay which can be employed in the control system of FIG. 1.

A schematic diagram of a comparator relay suitable for use as the comparator relay 31 shown in FIG. 1 is illustrated in FIG. 4. The relay comprises a top housing 125, a vent ring 126, an exhaust block 127, a center diaphragm ring 128 and a bottom housing 129. Within the housing, there is a top chamber 131, a chamber 133 below chamber 131 and separated therefrom by a diaphragm 135 and a chamber 137 separated from chamber 133 by a similar diaphragm 139. A similar double diaphragm 141 and 142 is also provided above a bottom chamber 143 and forming a chamber 145 therebetween. The upper and lower diaphragm assemblies forming chambers 133 and 145 between respective diaphragms of the respective assemblies are rigidly connected together by connecting screws 152 and 154. Thus the entire inner assembly of the relay is movable within the housing as a unit, the only restraint being provided by the diaphragms 135, 139 and 141, 142. Air supply is furnished through conduit 164 in center diaphragm ring 128 to chamber 145. Excess air is exhausted through an opening 156 in exhaust block 127 and conduit 35. It can also be seen that the output of the relay is obtained at output conduit 163 through the exhaust block 127. The openings 156 and 159 are either closed or open depending on the position of a plug 158. Plug 158 is carried in the down direction by the inner assembly to remove the plug 158 from opening 156. When the inner assembly moves upward seat 161 moves away from plug 158 opening passage 159. The plug 158 has a plunger portion 160 at the lower end thereof which receives and holds one end of a spring 162 tending to hold the plug 158 in its uppermost position against plug-seat 161.

Considering the operation of the comparator relay, the pressure signal from pressure relay 21 is inserted via conduit 29 and provides a corresponding pressure on diaphragm 135 forming the bottom wall of chamber 131. Similarly, the pressure signal proportional to the set-point is inserted from input conduit 33 into chamber 143 thereby producing a corresponding force on diaphragm 142 forming the top wall of chamber 143. Since the inner assembly, that is, the two diaphragm assemblies are rigidly attached together, the differential between the pressures in chambers 131 and 143 will cause corresponding movement of the inner assembly thereby controlling the position of plug 158 and accordingly the opening or closing of openings 156 and 159. Considering the situation where the signal from multiplying relay 21 is greater than the set-point signal, both diaphragm assemblies move downwardly, thus causing plug 158 to move down and uncover opening 156 thereby venting the pressure in chamber 137 to atmosphere through opening 156 and conduit 35 lowering the output pressure to zero. Considering the opposite pressure differential, the diaphragm assemblies will move upward thus causing plug 158 to close opening 156 and open passage 159 to supply full supply pressure to chamber 137 and thus to output conduit 163. Therefore, the operation of the comparator relay 31 provides full air pressure output when the input multiplied signal is less than the pressure of the set-point signal and no output signal when the multiplied input pressure signal is less than the set-point signal. It should be appreciated that the opposite action is obtainable if the set-point and input multiplied signals are interchanged.

As previously mentioned the 1:1 booster relay 41 is essentially the same as the 1:1 bias relay shown in FIG. 2 when the bias condition is zero.

The various pneumatic relays disclosed herein are merely examples of the types of relays that can be used in the control system of this invention. A number of other mechanizations capable of performing the same operation can be likewise utilized. Accordingly, it will be appreciated that the relays and other components disclosed herein do not form any part of the invention per se but the invention comprises the combination of these components into an improved control system.

Obviously, many modifications and variations of the invention as hereinabove set forth may be made without departing from the spirit and scope thereof, and therefore, only such limitations should be imposed as are indicated in the appended claims.

I claim:

1. A control system for adjusting a control element to regulate a measured variable comprising in combination, a measuring and transmitting means for providing a signal proportional to a change in said measured variable, a biasing means connected to said measuring and transmitting means for removing a predetermined amount from said proportional signal, a multiplying means connected to said biasing means for multiplying said proportional signal, set-point introducing means for introducing a set-point of operation for said control system and providing a corresponding set-point signal, a comparator means connected to said multiplying means and said set-point introducing means for comparing said multiplied proportional signal with said set-point signal, said comparator producing a maximum output signal when said multiplied proportional signal is less than said set-point signal and no signal output when said multiplied proportional signal is greater than said set-point signal, a signal restricting means connected to said comparator means for providing a signal which builds up with time to a value equal to said maximum output signal from said comparator when said comparator produces said full output signal, and providing decay with time of a signal previously transmitted therethrough when said comparator produces no output signal, thereby providing a smoothly rising or falling control signal to said control element.

2. A control system according to claim 1, wherein said signal restricting means is adjustable to change the build-up time and decay time of said control signal applied to said control element.

3. A control system according to claim 1, wherein a signal booster means is provided connected to said signal restricting means for boosting the control signal power for transmission to said control element.

4. A control system according to claim 3, wherein a switching means is provided connected between said booster means and said control element for switching operation of the control system to and from manual and automatic operating modes, and wherein feedback means is provided connected between the output of said switching means and the input of said signal booster means so that bumpless switching from manual to automatic means may be made.

5. Control system according to claim 4 wherein said feedback means includes a signal transmission restriction means to provide a signal to said signal booster means equivalent to the signal provided to the control element when the switching means is on manual so that bumpless transfer from manual to automatic operating modes can be made.

6. A pneumatic control system for adjusting a control element to regulate a measured variable comprising in combination, a force-balance pressure measuring and transmitting means for providing a pneumatic pressure signal proportional to the change in the measured variable, a pneumatic negatively biased relay connected to said measuring and transmitting means for receiving said proportional pneumatic pressure signal and subtracting therefrom a predetermined pressure established by the amount of negative bias applied thereto, a multiplying relay connected to the said bias relay for receiving the reduced pressure signal therefrom and multiplying said signal, a control station for providing a signal proportional to the set-point introduced at said station, a comparator relay having one input connected to said multiplying relay and another input thereof connected to said control station for comparing said multiplied signal from said multiplier with the set-point signal from said control station, said comparator relay providing full output when said multiplied signal pressure is less than said set-point signal pressure and providing no output when said multiplied signal pressure is greater than said set-point signal pressure, a restriction connected to the output of said comparator for providing a signal which builds up with time to a value equal to said maximum output signal from said comparator when said comparator produces said full output pressure signal, and providing decay with time of a signal previously transmitted therethrough when said comparator produces no output signal, thereby providing a smoothly varying control signal to correspindingly adjust the control element and measured variable.

7. Apparatus according to claim 6, wherein said restriction is adjustable to change the flow characteristics thereof thereby changing the time constant.

8. Apparatus according to claim 6, wherein a booster relay is provided connected to said restriction for receiving the signal passed thereby, a large source of pneumatic fluid connected to said booster relay, said booster relay providing a signal output proportional to the control signal input thereto from said restriction and providing sufficient volume of fluid from said source to maintain the signal pressure.

9. Apparatus according to claim 6, wherein a manual-automatic station is provided connected between said restriction and said control element for providing switching between the manual and automatic mode of control and wherein feedback means is provided connected between the output of said manual-automatic station and the input of said booster relay so that bumpless switching from manual to automatic control can be made.

10. Apparatus according to claim 9, wherein said feedback means includes a needle valve to provide a signal to said booster relay which corresponds to the signal applied to said control element when the manual-automatic control station is in manual mode.

References Cited

UNITED STATES PATENTS

| | | | |
|---|---|---|---|
| 2,935,077 | 5/1960 | Keyser | 137—86 X |
| 2,979,068 | 4/1961 | Griswold | 137—82 |
| 3,069,088 | 12/1962 | Scharpf | 137—82 X |
| 2,701,576 | 2/1955 | Higgins | 137—84 |

ALAN COHAN, *Primary Examiner.*